(12) United States Patent
Ahn et al.

(10) Patent No.: US 9,214,651 B1
(45) Date of Patent: Dec. 15, 2015

(54) SECONDARY BATTERY

(71) Applicant: Samsung SDI Co., Ltd., Yongin-si, Gyeonggi-do (KR)

(72) Inventors: Byungkook Ahn, Yongin-si (KR); Jaemin Kim, Yongin-si (KR); Daeyon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/626,763

(22) Filed: Feb. 19, 2015

(30) Foreign Application Priority Data

Nov. 26, 2014 (KR) .................. 10-2014-0166621

(51) Int. Cl.
  *H01M 2/10* (2006.01)
  *H01M 10/42* (2006.01)
  *H01M 2/02* (2006.01)

(52) U.S. Cl.
  CPC ........ *H01M 2/0207* (2013.01); *H01M 10/4257* (2013.01); *H01M 2010/4271* (2013.01); *H01M 2220/30* (2013.01)

(58) Field of Classification Search
  CPC .......... H01M 2/0207; H01M 10/4257; H01M 2010/4271; H01M 2220/30
  USPC .............................................. 429/7, 100, 159
  See application file for complete search history.

(56) References Cited

U.S. PATENT DOCUMENTS

| | | |
|---|---|---|
| 2012/0270074 A1 | 10/2012 | Koh |
| 2012/0276419 A1 | 11/2012 | Park |
| 2013/0045397 A1 | 2/2013 | Pyo |
| 2014/0065448 A1 | 3/2014 | Ahn et al. |
| 2014/0178716 A1 | 6/2014 | Wang |
| 2014/0220387 A1 | 8/2014 | Lee |

(Continued)

FOREIGN PATENT DOCUMENTS

| | | | |
|---|---|---|---|
| CN | 202231073 U | 5/2012 | |
| JP | 2001256937 A * | 9/2001 | .............. H01M 2/10 |

(Continued)

OTHER PUBLICATIONS

Korean Notice of Allowance dated Apr. 29, 2015 for Korean Patent Application No. KR 10-2014-0166622 which corresponds to U.S. Appl. No. 14/626,808, which is related to captioned U.S. Appl. No. 14/626,763, and cites the above-identified references numbered 3-4.

(Continued)

*Primary Examiner* — Karie O'Neill Apicella
(74) *Attorney, Agent, or Firm* — Knobbe, Martens, Olson & Bear, LLP

(57) ABSTRACT

A secondary battery is disclosed. In one aspect, the battery includes first and second battery cells facing each other and a case comprising first and second cell accommodators respectively at least partially accommodating the first and second battery cells, and a circuit accommodator formed between the first and second cell accommodators and accommodating a protection circuit configured to control charging and discharging operations. The circuit accommodator has top and bottom surfaces opposing each other, and each of the first and second cell accommodators has top and bottom surfaces opposing each other. The top surface of the circuit accommodator has a downward step with respect to the top surfaces of the first and second cell accommodators.

20 Claims, 8 Drawing Sheets

(56) References Cited

U.S. PATENT DOCUMENTS

| | | |
|---|---|---|
| 2014/0220389 A1 | 8/2014 | Lee |
| 2014/0220390 A1 | 8/2014 | Park et al. |

FOREIGN PATENT DOCUMENTS

| | | |
|---|---|---|
| KR | 10-2005-0069075 A | 7/2005 |
| KR | 10-2009-0027393 A | 3/2009 |
| KR | 10-2012-0122860 A | 11/2012 |
| KR | 10-2012-0123172 A | 11/2012 |
| KR | 10-2013-0042095 A | 4/2013 |
| KR | 10-1274923 B1 | 6/2013 |
| KR | 10-2014-0032596 A | 3/2014 |
| KR | 10-2014-0081658 A | 7/2014 |
| KR | 10-2014-0100109 A | 8/2014 |
| KR | 10-2014-0100291 A | 8/2014 |

OTHER PUBLICATIONS

Korean Office Action dated Dec. 29, 2014 for Korean Patent Application No. KR 10-2014-0166621 which corresponds to captioned U.S. Appl. No. 14/626,763, and cites the above-identified references numbered 4-7.

Korean Office Action dated Dec. 29, 2014 for Korean Patent Application No. KR 10-2014-0166622 which corresponds to U.S. Appl. No. 14/626,808 which is related to captioned U.S. Appl. No. 14/626,763, and cites the above-identified references numbered 8-9.

* cited by examiner

SECONDARY BATTERY

CROSS-REFERENCE TO RELATED APPLICATIONS

This application claims the benefit of Korean Patent Application No. 10-2014-0166621, filed on Nov. 26, 2014, in the Korean Intellectual Property Office, the disclosure of which is incorporated herein in its entirety by reference.

This application relates to U.S. patent application entitled "RECHARGEABLE BATTERY" (application Ser. No. 14/626,808), which is concurrently filed on the same date as this application and incorporated herein by reference in their entirety.

BACKGROUND

1. Field

The described technology generally relates to a secondary battery.

2. Description of the Related Technology

Due to the development of wireless Internet and communication technologies, portable electronic devices, such as a mobile phone and portable computers, are in wide use. For the electronic devices to be used in various places without having to use a power supply device, the electronic devices may include one or more secondary batteries.

SUMMARY OF CERTAIN INVENTIVE ASPECTS

One inventive aspect is a secondary battery from which an unnecessary internal dead space is removed and that has a reduced overall volume.

Another aspect is a secondary battery from which physical interference with a set device is removed and that is prevented from shaking or moving inside the set device, when the secondary battery is applied as a driving power source of the set device.

Another aspect is a secondary battery that includes: first and second battery cells that face each other; and a case that includes first and second cell accommodators respectively accommodating the first and second battery cells, and a circuit accommodator formed between the first and second cell accommodators and accommodating a protection circuit for controlling charging and discharging operations, wherein a top surface of the circuit accommodator has a downward step than top surfaces of the first and second cell accommodators.

The top surface of the circuit accommodator and the top surfaces of the first and second cell accommodators may be surfaces facing a same direction as main surfaces of the first and second battery cells.

A bottom surface of the circuit accommodator and bottom surfaces of the first and second cell accommodators may substantially form a same plane.

Each of the first and second battery cells may include a cell body and an electrode tab protruding from the cell body, wherein the electrode tabs of the first and second battery cells may extend in directions facing each other.

The case may have a rectangular shape having a pair of long side portions and a pair of short side portions.

The first and second battery cells may be assembled in a direction parallel to the pair of long side portions of the case.

The first and second battery cells may be respectively inserted into the first and second cell accommodators.

Each of the first and second cell accommodators may include: a blocking portion that defines an assembled location of the first and second battery cells; and a rim portion that surrounds front ends of the first and second battery cells by extending from the blocking portion and forms openings for accommodating the first and second battery cells.

The rim portion may entirely surround outer circumferences of the front ends of the first and second battery cells.

The rim portion may have a shape matching the front ends of the first and second battery cells.

The rim portion may be formed seamlessly.

An electrode tab of each of the first and second battery cells may extend towards the circuit accommodator by detouring the blocking portion and be connected to the protection circuit accommodated in the circuit accommodator.

The circuit accommodator may include: a body that integrally extends from the first and second cell accommodators; and a cover that forms an accommodation space together with the body by being combined on the body.

A top surface of the body may integrally extend from the first and second cell accommodators, and a bottom surface of the body may be opened to be combined to the cover.

A top surface of the body may have a downward step than the top surfaces of the first and second cell accommodators.

Another aspect is a secondary battery, comprising: first and second battery cells facing each other; and a case comprising first and second cell accommodators respectively at least partially accommodating the first and second battery cells, and a circuit accommodator formed between the first and second cell accommodators and accommodating a protection circuit configured to control charging and discharging operations of the first and second battery cells, wherein the circuit accommodator has top and bottom surfaces opposing each other, wherein each of the first and second cell accommodators has top and bottom surfaces opposing each other, and wherein the top surface of the circuit accommodator has a downward step with respect to the top surfaces of the first and second cell accommodators.

In the above battery, the top surface of the circuit accommodator and the top surfaces of the first and second cell accommodators face substantially the same direction as a main surface of each of the first and second battery cells, and wherein the main surface is defined as a surface having the greatest area in each of the first and second battery cells. In the above battery, the bottom surface of the circuit accommodator and the bottom surfaces of the first and second cell accommodators are substantially coplanar. In the above battery, each of the first and second battery cells comprises a cell body and an electrode tab extending outwardly from the cell body, and wherein the electrode tabs of the first and second battery cells extend in directions facing each other. In the above battery, the case has a substantially rectangular shape having a pair of long side portions and a pair of short side portions. In the above battery, the first and second battery cells are assembled in a direction substantially parallel to the pair of long side portions of the case. In the above battery, the first and second battery cells are respectively inserted into the first and second cell accommodators.

In the above battery, each of the first and second cell accommodators comprises: a blocking portion that defines an assembled location of the first and second battery cells; and a rim portion that surrounds front ends of the first and second battery cells by extending from the blocking portion and forms openings configured to accommodate the first and second battery cells. In the above battery, the rim portion entirely surrounds outer circumferences of the front ends of the first and second battery cells. In the above battery, the rim portion has a shape matching the front ends of the first and second battery cells. In the above battery, the rim portion is formed seamlessly. In the above battery, each of the first and second battery cells comprises an electrode tab extending towards the circuit accommodator by detouring the blocking portion and connected to the protection circuit. In the above battery, the circuit accommodator comprises: a body that integrally extends from the first and second cell accommodators; and a cover that is connected to the body and forms an accommodation space together with the body. In the above battery, the body has top and bottom surfaces opposing each other, and wherein the top surface of the body integrally extends from the first and second cell accommodators, and wherein the bottom surface of the body is opened to be combined to the cover. In the above battery, the body has top and bottom surfaces opposing each other, and wherein the top surface of the body has a downward step with respect to the top surfaces of the first and second cell accommodators.

Another aspect is a secondary battery, comprising: first and second battery cells facing each other; and a case comprising first and second cell accommodators respectively at least partially accommodating the first and second battery cells, and a circuit accommodator formed between the first and second cell accommodators and accommodating a protection circuit configured to control charging and discharging operations of the first and second battery cells, wherein the circuit accommodator has top and bottom surfaces opposing each other, wherein each of the first and second cell accommodators has top and bottom surfaces opposing each other, and wherein the top surface of the circuit accommodator is closer to the bottom surface of the circuit accommodator than the top surfaces of the first and second cell accommodators.

In the above battery, the top surface of the circuit accommodator has a downward step with respect to the top surfaces of the first and second cell accommodators. In the above battery, each of the first and second battery cells comprises a cell body and an electrode tab extending outwardly from the cell body, and wherein the electrode tabs of the first and second battery cells extend in directions facing each other. In the above battery, the top surface of the circuit accommodator does not overlap the top surfaces of the first and second cell accommodators in a direction substantially parallel to the bottom surface of the case. In the above battery, the bottom surface of the circuit accommodator is substantially aligned with the bottom surfaces of the first and second cell accommodators in the direction.

DETAILED DESCRIPTION OF CERTAIN INVENTIVE EMBODIMENTS

Figure 1:
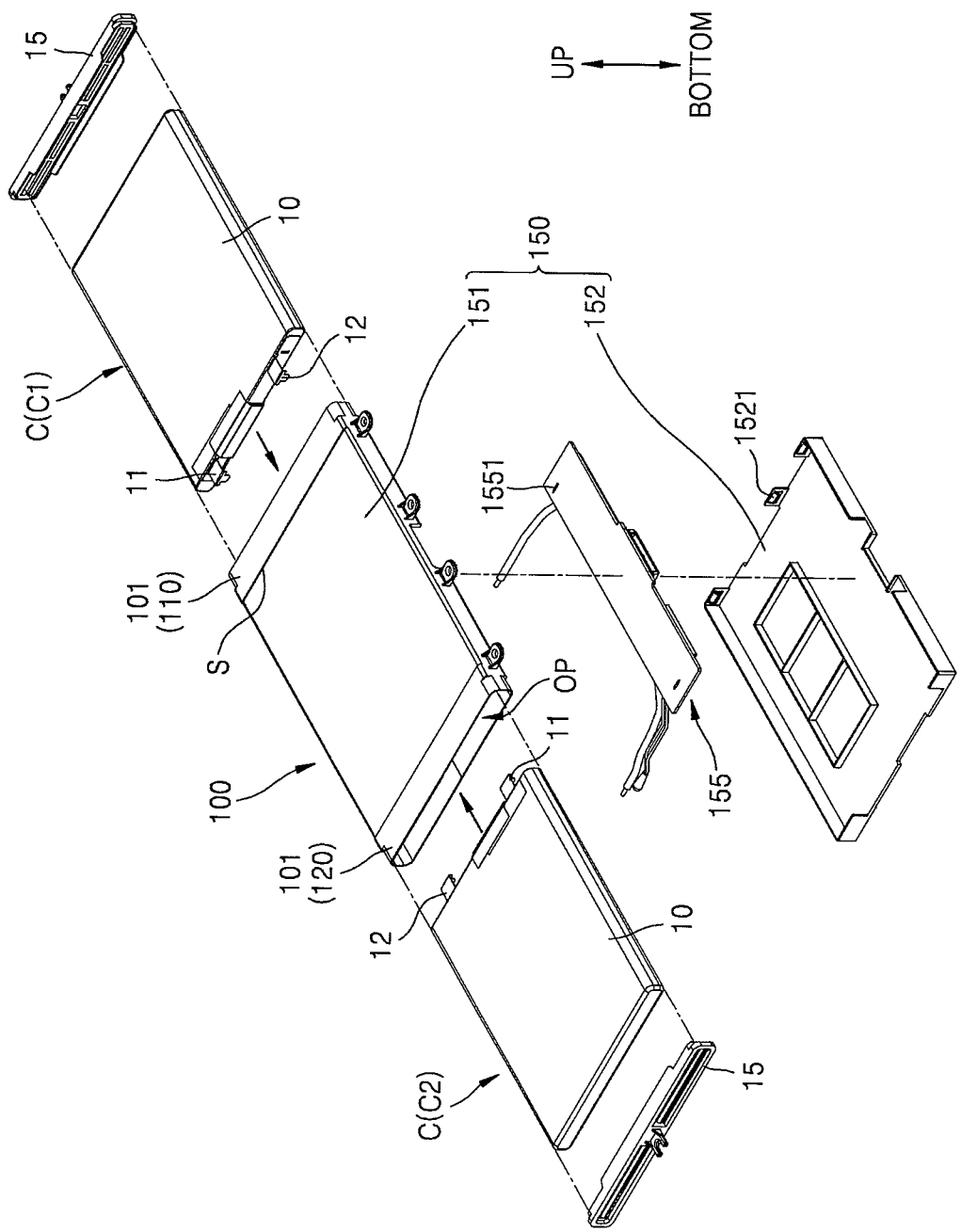
FIG. 1 is an exploded perspective view of a secondary battery according to an exemplary embodiment.

Reference will now be made in detail to exemplary embodiments, examples of which are illustrated in the accompanying drawings, wherein like reference numerals refer to like elements throughout. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Referring to FIGS. 1 through 4, the secondary battery includes first and second battery cells C1 and C2 that face each other, and a case 100 that accommodates the first and second battery cells C1 and C2 and accommodates a protection circuit 155 for controlling charging and discharging operations of the first and second battery cells C1 and C2.

The case 100 includes first and second cell accommodators 110 and 120 that respectively accommodate the first and second battery cells C1 and C2, and a circuit accommodator 150 that is formed between the first and second cell accommodators 110 and 120 and accommodates the protection circuit 155 for controlling the charging and discharging operations.

The first and second battery cells C1 and C2 may have substantially the same structure and shape. Herein, a battery cell C may mean any one of the first and second battery cells C1 and C2 or both of the first and second battery cells C1 and C2.

The battery cell C may include a cell body 10 and first and second electrode tabs 11 and 12 protruding from the cell body 10. Herein, the first and second battery cells C1 and C2 facing each other may mean that the first and second electrode tabs 11 and 12 of the first and second battery cells C1 and C2 extend in directions facing each other.

The battery cell C may include the first and second electrode tabs 11 and 12 having different polarities. Here, the first and second electrode tabs 11 and 12 may be formed on the same surface of the cell body 10, e.g., on a front surface of the battery cell C in an assembled direction. Also, the first and second electrode tabs 11 and 12 of the first battery cell C1 and the first and second electrode tabs 11 and 12 of the second battery cell CD2 may extend in directions facing each other.

Figure 2:
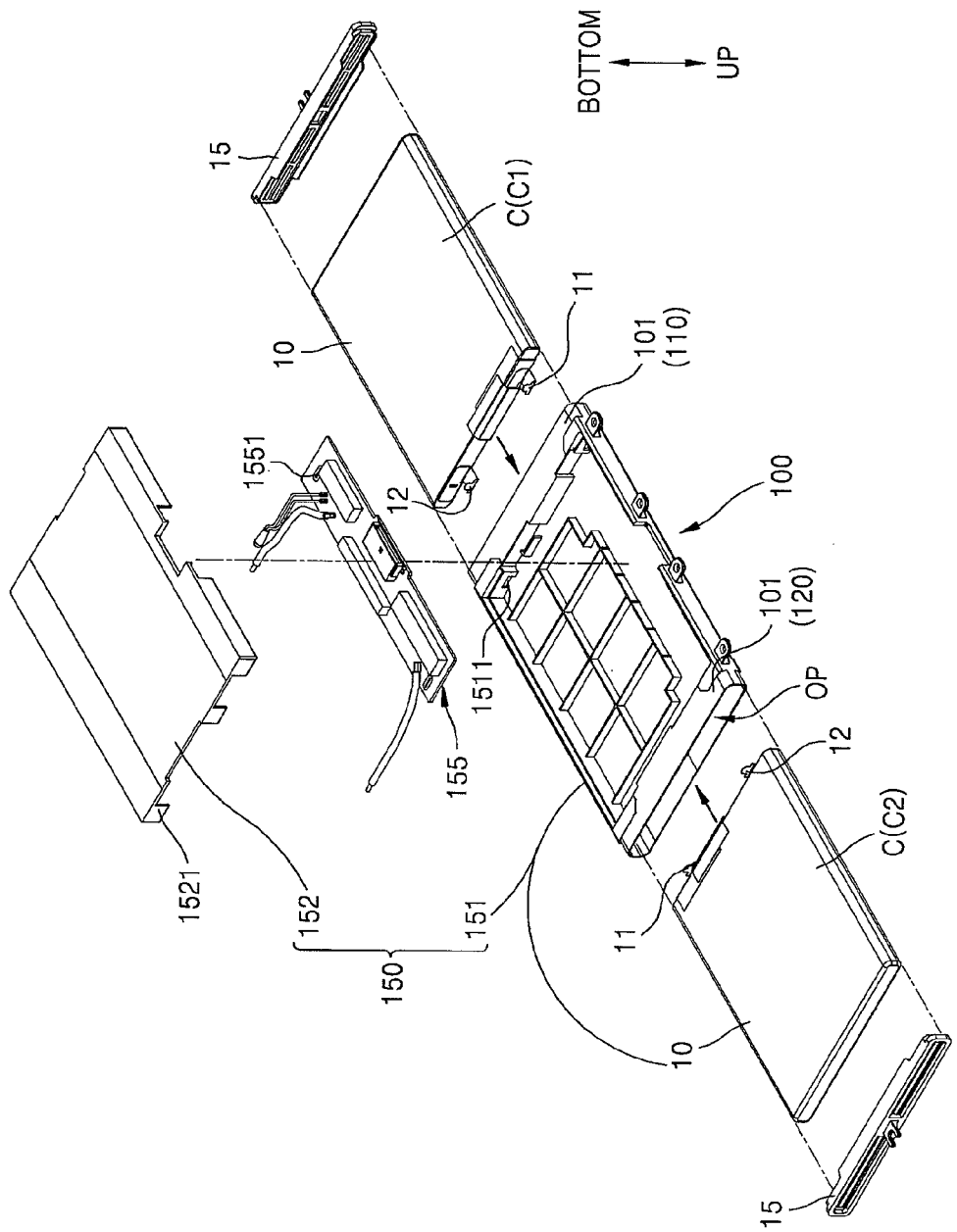
FIG. 2 is an inverted exploded perspective view of the secondary battery of FIG. 1.

For example, the first electrode tabs 11 of the first and second battery cells C1 and C2 may face each other and the second electrode tabs 12 of the first and second battery cells C1 and C2 may face each other. Alternatively, as shown in FIGS. 1 and 2, the first and second electrode tabs 11 and 12 of the first battery cell C1 and the second and first electrode tabs 12 and 11 of the second battery cell C2 may face each other. For example, the first and second electrode tabs 11 and 12 of the first and second battery cells C1 and C2 may intercrossly face each other. Arrangements of the first and second electrode tabs 11 and 12 of the first and second battery cells C1 and C2 may differ based on connections, i.e., series connections or parallel connections, of the first and second battery cells C1 and C2.

The cell body 10 may include main surfaces on top and bottom. Herein, a main surface means a surface having a greatest area when the cell body 10 approximately has a substantially hexahedral shape. For example, the main surfaces of the cell body 10 are top and bottom surfaces of the cell body 10.

Figure 4:
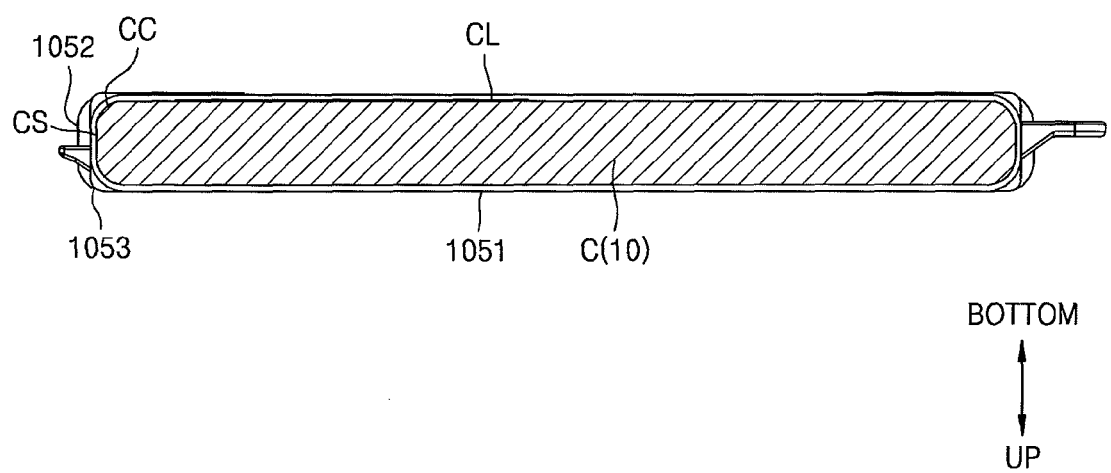
FIG. 4 is a cross-sectional view taken along a line IV-IV of FIG. 3.

Referring to FIG. 4, the cell body 10 may approximately have a rectangular cross section having relatively long side portions CL and relatively short side portions CS. For example, the cell body 10 has a pair of long side portions CL that are substantially parallel to each other and a pair of short side portions CS that are substantially parallel to each other, and has corner portions CC that are round and connect the long side portions CL and the short side portions CS to each other.

The first and second battery cells C1 and C2 are accommodated in the case 100. Herein, the first and second battery cells C1 and C2 being accommodated in the case 100 means that all or parts of the first and second battery cells C1 and C2 are accommodated in the case 100. According to an exemplary embodiment, the case 100 accommodates parts of the first and second battery cells C1 and C2, e.g., front ends of the first and second battery cells C1 and C2 in an assembled direction.

According to an exemplary embodiment, the case 100 includes the first and second cell accommodators 110 and 120 respectively to which the first and second battery cells C1 and C2 are inserted and assembled. The first and second cell accommodators 110 and 120 may have substantially the same shape so as to accommodate the first and second battery cells C1 and C2 substantially having the same structure. Herein, a cell accommodator 101 may denote any one of the first and second cell accommodators 110 and 120 or both of the first and second cell accommodators 110 and 120.

Figure 3:
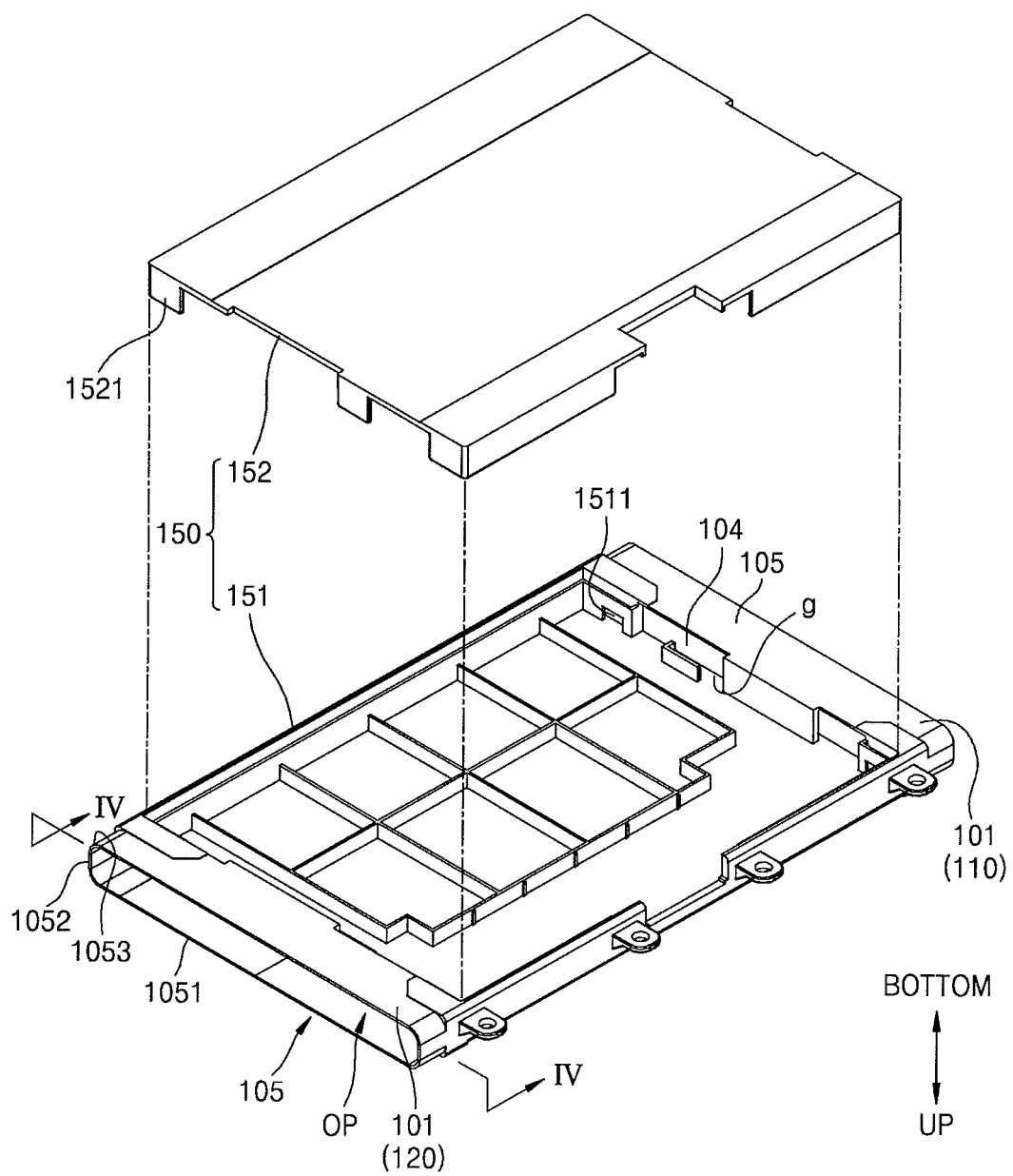
FIG. 3 is an exploded perspective view of a case of FIG. 2.

Referring to FIG. 3, each of the first and second cell accommodators 110 and 120 includes a blocking portion 104 that defines assembled locations of the first and second battery cells C1 and C2, and a rim portion 105 that extends from the blocking portion 104 and forms openings OP for accommodating the first and second battery cells C1 and C2.

The first and second battery cells C1 and C2 are inserted and assembled to the case 100 through the openings OP that are formed on opposite locations of the case 100. At this time, the battery cells C1 and C2 may be assembled to face each other. A front end of the battery cell C is accommodated through the opening OP, and the opening OP may be defined by the rim portion 105 surrounding the front end of the battery cell C. An outer side of the battery cell C assembled through the opening OP may face an inner side of the rim portion 105.

The rim portion 105 may substantially surround the entirety of an outer side of the front end of the battery cell C. For example, the rim portion 105 surrounds the front end of the battery cell C in an assembled direction, and substantially surrounds the entire outer side of the front end. The rim portion 105 may have a shape matching the front end of the battery cell C.

The rim portion 105 is formed to substantially surround the entirety of an outer side of the battery cell C seamlessly. For example, the rim portion 105 extends along the outer side of the battery cell C seamlessly. Here, the rim portion 105 being extended seamlessly means that the rim portion 105 is not formed by contacting or connecting different individual portions, but is integrally formed.

Referring to FIG. 4, the rim portion 105 includes a pair of long side portions 1051 covering the long side portions CL of the battery cell C, a pair of short side portions 1052 covering the short side portions CS of the battery cell C, and corner portions 1053 covering the corner portions CC of the battery cell C between the long and short side portions CL and CS.

Referring to FIG. 3, the rim portion 105 externally extends from the blocking portion 104 that defines an assembled location of the battery cell C. For example, the rim portion 105 extends from the blocking portion 104 towards the battery cell C and cover an outer side of the battery cell C.

The blocking portion 104 may define the assembled location by restricting a location of the battery cell C by contacting the front end of the battery cell C in the assembled direction. For example, the blocking portion 104 allows entry of the battery cell C only up to the assembled location of the battery cell C along the assembled direction and does not allow further entry so as to define the assembled location of the battery cell C.

The blocking portion 104 can define a boundary location for allowing the entry of the battery cell C, and define a boundary of the cell accommodator 101. For example, the cell accommodator 101 and the circuit accommodator 105 are classified from each other based on the blocking portion 104.

Referring to FIGS. 2 and 3 together, a gap g for detour of the first and second electrode tabs 11 and 12 of the battery cell C is formed below the blocking portion 104. The first and second electrode tabs 11 and 12 can detour the blocking portion 104 through the gap g below the blocking portion 104 and extend towards the circuit accommodator 150. Furthermore, the first and second electrode tabs 11 and 12 may connect to the protection circuit 155 inside the circuit accommodator 150. For example, the first and second electrode tabs 11 and 12 is inserted into connection holes 1551 formed in the protection circuit 155. The first and second electrode tabs 11 and 12 form paths of charging and discharging currents of the battery cell C, wherein the charging and discharging currents may flow to the protection circuit 155 through the first and second electrode tabs 11 and 12.

The circuit accommodator 150 accommodating the protection circuit 155 for controlling the charging and discharging operations of the battery cell C can be formed between the first and second cell accommodators 110 and 120. The circuit accommodator 150 includes a body 151, and a cover 152 combined to the body 151 to form an accommodation space together with the body 151.

Referring to FIG. 3, the body 151 of the circuit accommodator 150 extends integrally from the first and second cell accommodators 110 and 120 formed on two sides. In some embodiments, the body 151 integrally extends from the rim portion 105 of the cell accommodator 101. For example, the cell accommodator 101 integrally extends from the pair of short side portions 1052 of the rim portion 105 and one long side portion 1051 between the short side portions 1052. The body 151 may include a top surface integrally extending from one long side portion 1051 of the rim portion 105.

One main surface (i.e., a bottom surface) of the body 151 of the circuit accommodator 150, which is substantially parallel to the main surfaces of the battery cell C, may have an opened shape. Here, the main surface of the battery cell C means a surface having a greatest area in the battery cell C having a substantially hexahedral shape. For example, the main surfaces of the battery cell C are top and bottom surfaces. Also, the bottom surface of the body 151 of the circuit accommodator 150 may have an opened shape, and the cover 152 may be combined to the body 151 through such a bottom surface. The cover 152 can be combined to the body 151 so as to form an accommodation space for accommodating the protection circuit 155.

The protection circuit 155 may be accommodated inside the circuit accommodator 150 through the bottom surface of the body 151, and the cover 152 may seal the bottom surface of the body 151 accommodating the protection circuit 155 so as to close the circuit accommodator 150.

The body 151 of the circuit accommodator 150 may be combined to the cover 152 via hook connection. For example, a hook 1521 is formed on any one of the body 151 and the cover 152 of the circuit accommodator 150, and a coupling hole 1511 to which the hook 1521 is coupled is formed on the other one. However, the described technology is not limited thereto, and the body 151 and the cover 152 may be combined via any one of various well-known coupling methods.

The protection circuit 155 can be accommodated inside the circuit accommodator 150. The protection circuit 155 can form an electric connection with the battery cell C. The first and second electrode tabs 11 and 12 of the battery cell C may extend towards the circuit accommodator 150 and connect to the protection circuit 155 inside the circuit accommodator 150. For example, referring to FIGS. 2 and 3 together, the first and second electrode tabs 11 and 12 extend into the circuit accommodator 150 through the gap g below the blocking portion 104, and connect to the protection circuit 155 in the circuit accommodator 150.

The connection holes 1551 to which the first and second electrode tabs 11 and 12 are inserted may be formed on the protection circuit 155 (circuit board). For example, the protection circuit 155 is electrically connected to the first and second battery cells C1 and C2, and includes different connection holes 1551 for connecting to the first and second battery cells C1 and C2 at both sides.

The protection circuit 155 may control the charging and discharging operations of the first and second battery cells C1 and C2 that are connected to two sides of the protection circuit 155. For example, the protection circuit 155 monitors a state of the battery cell C by gathering state information of the first and second battery cells C1 and C2, such as a voltage, a current, and a temperature. Then, the protection circuit 155 may control the charging and discharging operations of the first and second battery cells C1 and C2 based on results of the monitoring.

The protection circuit 155 may electrically connect the first and second battery cells C1 and C2 to each other. For example, the protection circuit 155 connects the first and second battery cells C1 and C2 in series or in parallel. The first and second battery cells C1 and C2 may be connected in series or in parallel based on electric output characteristics required by the secondary battery.

The circuit accommodator 150 can provide an accommodation space sufficient to accommodate the protection circuit 155, and include a surplus space. Such a surplus space remaining after accommodating the protection circuit 155 is a dead space that does not substantially contribute to charging and discharging operation of the secondary battery while increasing an overall volume of the secondary battery.

A top or bottom surface of the circuit accommodator 150 may be led into the circuit accommodator 150 so that a dead space of the circuit accommodator 150 is reduced and the overall volume of the secondary battery is reduced. For example, the top surface of the circuit accommodator 150, e.g., the top surface of the body 151, or the bottom surface of the circuit accommodator 150, e.g., the bottom surface of the cover 152, is led into the circuit accommodator 150.

Such a leading shape of the circuit accommodator 150 can reduce the overall volume of the secondary battery, and substantially prevent physical interference with a set device (not shown) and prevent the secondary battery from shaking or moving inside the set device when the secondary battery is used as a driving power source of the set device. For example, when an internal mounting space of the set device is stepped, the secondary battery is compactly mounted, and the secondary battery is substantially prevented from shaking or moving inside the set device by assembling the set device and the secondary battery to match each other.

Figure 5:
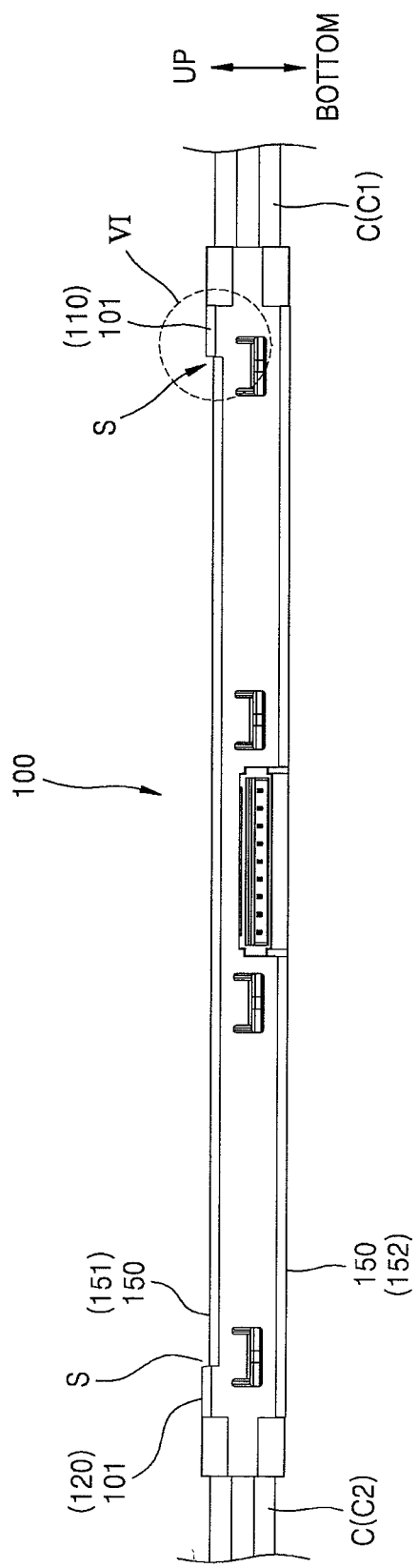
FIG. 5 is a side view of the secondary battery of FIG. 1.
Figure 6:
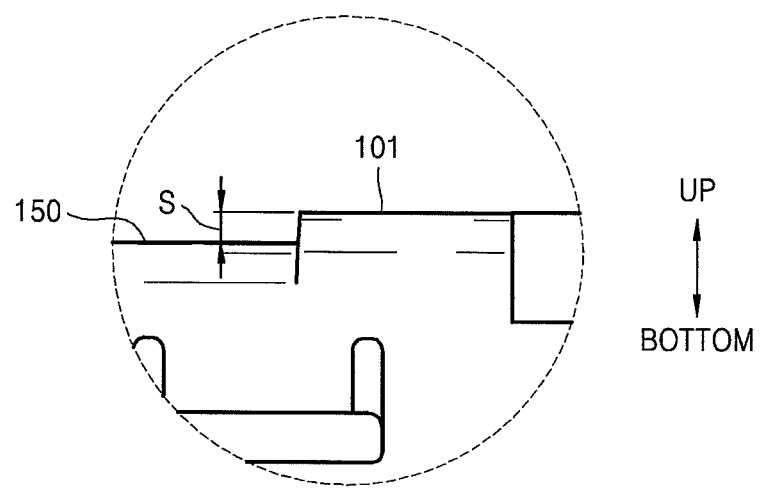
FIG. 6 is an enlarged view of a region VI of FIG. 5.

FIG. 5 is a side view of the secondary battery of FIG. 1, and FIG. 6 is an enlarged view of a region VI of FIG. 5.

Referring to FIGS. 5 and 6, the top surface of the circuit accommodator 150 is formed to have a downward step S with respect to the top surface of the cell accommodator 101. The top surface of the circuit accommodator 150 and the top surface of the cell accommodator 101 can face substantially the same direction. For example, the top surface of the circuit accommodator 150 and the top surface of the cell accommodator 101 face substantially the same direction as the main surface of the battery cell C.

The downward step S of the top surface of the circuit accommodator 150 with respect to the top surface of the cell accommodator 101 may reduce a dead space of the circuit accommodator 150, which is remaining after accommodating the protection circuit 155 as described above, thereby reducing an overall volume of the secondary battery.

It can be difficult to reduce sizes of the first and second battery cells C1 and C1, e.g., sizes of the first and second cell accommodators 110 and 120, in order to adjust to required output characteristics, but it is possible to reduce a space of the circuit accommodator 150, and thus the top surface of the circuit accommodator 150 may have the downward step S compared to the top surface of the cell accommodator 101.

The downward step S may substantially prevent physical interference between the secondary battery and the set device and provide the secondary battery matching a mounting space of the set device, when the secondary battery is applied as a driving power source of the set device. For example, when a stepped shape is formed in the mounting space of the set device, the secondary battery having a stepped shape matching the mounting space is mounted such that the secondary battery that does not generate physical interference with the set device is provided without having to change a design of the set device.

Also, since the set device and the secondary battery are assembled in matching shapes, the secondary battery may be substantially prevented from shaking or moving inside the set device and firmly fixed inside the set device. Accordingly, a physical damage of the secondary battery caused by movement inside the set device may be substantially prevented.

The secondary battery may be applied as a power supply device of a laptop (not shown). The secondary battery may be mounted below a touch pad (not shown) of the laptop, and the laptop may have a relatively thin thickness at the touch pad compared to other locations. For example, the circuit accommodator 150 of the secondary battery is formed at the location of the touch pad. At this time, the secondary battery having the circuit accommodator 150 having a relatively thin thickness may be smoothly mounted in the laptop without physical interference with the touch pad and without having to change a design of the laptop.

Meanwhile, referring to FIG. 5, the bottom surface of the circuit accommodator 150 and the bottom surface of the cell accommodator 101 forms substantially the same plane. For example, the bottom surfaces of the circuit accommodator 150 and cell accommodator 101 form the same plane since, when the secondary battery is mounted in the set device, and the entire bottom surface of the secondary battery is formed on the same support surface (not shown). Furthermore, the bottom surface of the circuit accommodator 150 and the bottom surface of the cell accommodator 101 may be supported on the same support surface in the set device.

Herein, the top and bottom surfaces of the circuit accommodator 150 may be switched based on an arrangement of the secondary battery. Similarly, the top and bottom surfaces of the cell accommodator 101 may be switched based on the arrangement of the secondary battery. The top and bottom surfaces of the circuit accommodator 150 and cell accommodator 101 may mean two surfaces substantially parallel to the main surface of the battery cell C, but the top and bottom surfaces may be switched based on the arrangement of the secondary battery. Thus, according to an exemplary embodiment, the bottom surface of the circuit accommodator 150 has an upward step with respect to the bottom surface of the cell accommodator 101. At this time, the circuit accommodator 150 may also be led inward.

For example, even when any one of the body 151 and the cover 152 of the circuit accommodator 150 is led inward, the circuit accommodator 150 is led inward. Furthermore, any one of the body 151 and the cover 152 may form the downward step S with the cell accommodator 101, and the other one of the body 151 and the cover 152 may form a plane with the cell accommodator 101.

Figure 7:
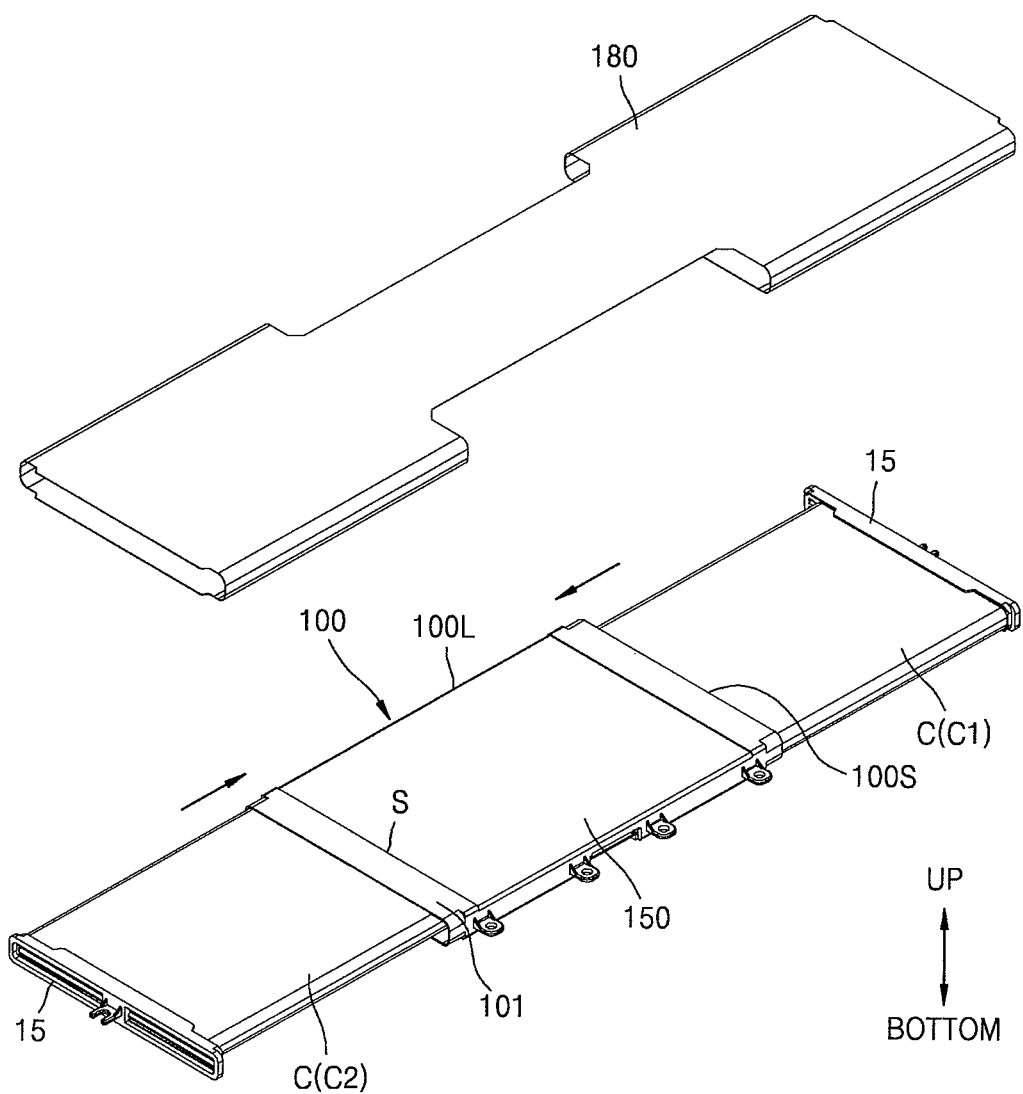
FIG. 7 is a perspective view of an assembled state of a battery cell and a case.

FIG. 7 is a perspective view of an assembled state of the battery cell C and the case 100. Referring to FIG. 7, the case 100 may have a substantially rectangular shape having a pair of long side portions 100L and a pair of short side portions 100S. Here, the long side portions 100L of the case 100 may be substantially parallel to an arranged direction of the battery cell C. For example, the long side portions 100L of the case 100 is substantially parallel to an assembled direction of the battery cell C.

The case 100 may be formed between the first and second battery cells C1 and C2 in a direction of the long side portion 100L such that an interval between the first and second battery cells C1 and C2 is relatively long. Herein, the case 100 formed between the first and second battery cells C1 and C2 may be formed in a direction of the long side portion 100L or the short side portion 100S such that the interval between the first and second battery cells C1 and C2 is formed to be relatively long or short.

The secondary battery may be applied as a driving power source of a set device (not shown), and at this time, a structure of the secondary battery may be suitably changed according to a design of the set device. The secondary battery may be mounted in a laptop (not shown), for example, below a touch pad (not shown) of the laptop. The circuit accommodator 150 of the secondary battery may be formed at a location corresponding to the touch pad, and the circuit accommodator 150 may have the downward step S with respect to the cell accommodator 101 to match a shape of the touch pad.

The touch pad of the laptop may have a substantially rectangular shape having a pair of long side portions (not shown) and a pair of short side portions (not shown), and the long side portions of the circuit accommodator 150 may be arranged substantially parallel to arranged directions of the first and second battery cells C1 and C2 such that the long side portions and short side portions of the circuit accommodator 150 align the long side portions and short side portions of the touch pad. For example, the protection circuit 155 (circuit board) accommodated in the circuit accommodator 150 has the long side portions substantially parallel to the arranged directions of the first and second battery cells C1 and C2.

A label sheet 180 may be attached on the battery cell C and the case 10 to which the battery cell C is inserted. For example, the label sheet 180 is attached to cover all of the first and second battery cells C1 and C2 and the case 100 to which the first and second battery cells C1 and C2 are inserted.

According to an exemplary embodiment, the label sheet 180 forms an outer shape of the secondary battery. For example, the battery cell C and the case 100 to which the label sheet 180 is attached is mounted on a set device (not shown) as a completed product without having to use an additional casing. Furthermore, according to an exemplary embodiment, a part of the battery cell C is inserted into the case 100, and the remaining part of the battery cell C is externally exposed without being accommodated in a casing except for the label sheet 180.

According to an exemplary embodiment, the case 100 that is assembled such that a part of the battery cell C is inserted is applied. The case 100 includes the cell accommodator 101 surrounding the outer side of the front end of the battery cell C. Here, the cell accommodator 101 can substantially surround the entire outer side of the front end of the battery cell C to increase resistance to bending, wrapping, or twisting of the secondary battery.

In a comparative example, the battery cell C and the protection circuit 155 is accommodated in upper and lower cases (not shown) that are assembled in directions facing each other. According to such a structure, the upper and lower cases cover top and bottom surfaces of the battery cell C and the protection circuit 155, and thus the structure is vulnerable to bending, wrapping, or twisting of the secondary battery.

However, according to an exemplary embodiment, the case 100 includes the cell accommodator 101 that substantially surrounds the entire outer side of the front end of the battery cell C, thereby substantially surrounding the entire outer side as well as the top and bottom surfaces of the battery cell C. Accordingly, resistance to bending, wrapping, or twisting of the secondary battery may increase, thereby preventing the secondary battery from being damaged by bending, wrapping, or twisting. A reference numeral 15 of FIG. 7 denotes a cell cover inserted to an exposed surface of the battery cell C.

Figure 8:
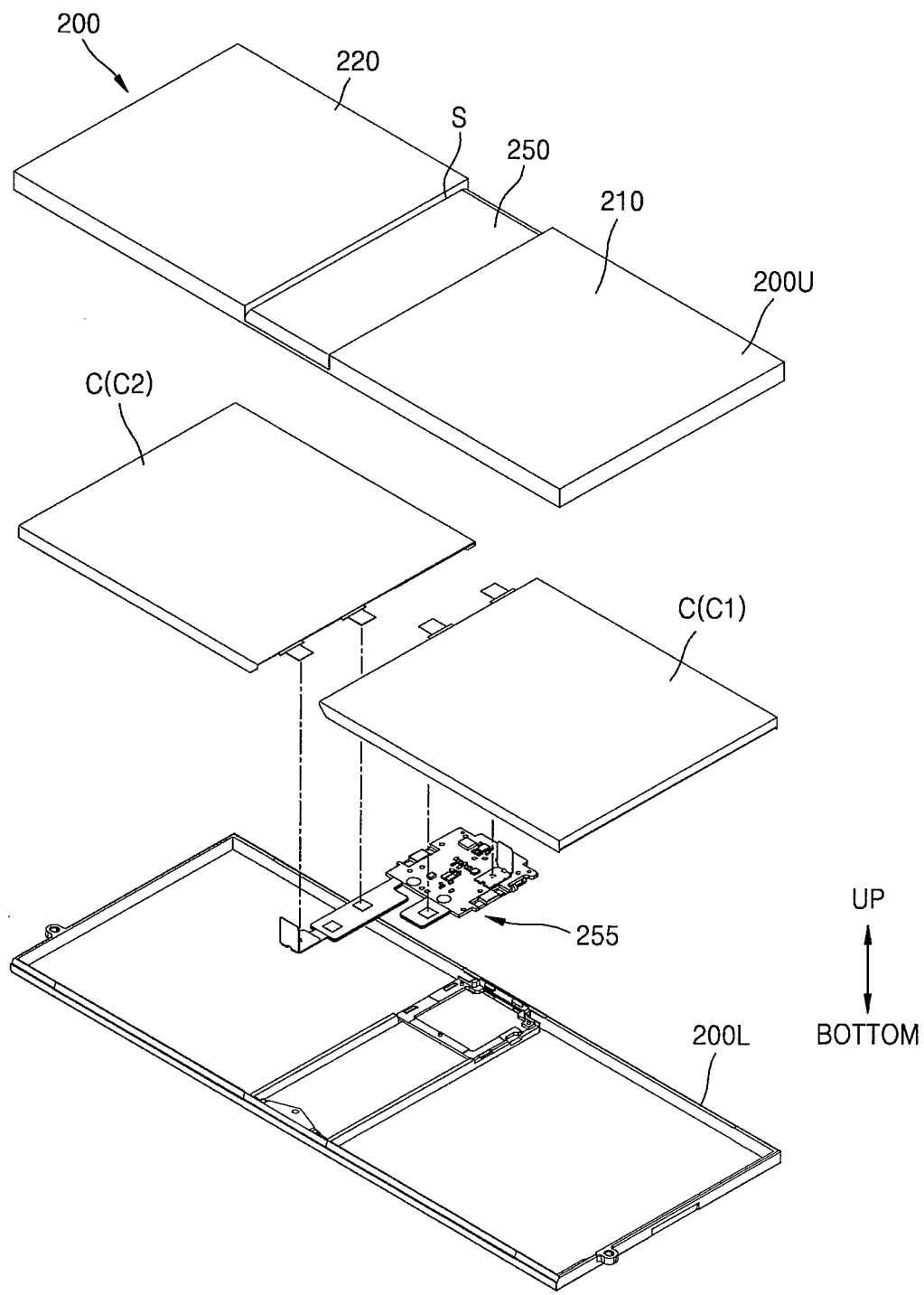
FIG. 8 is an exploded perspective view of a secondary battery according to another exemplary embodiment.

FIG. 8 is an exploded perspective view of a secondary battery according to another exemplary embodiment. Referring to FIG. 8, the secondary battery includes the first and second battery cells C1 and C2 that face each other, and a case 200 that includes first and second cell accommodators 210 and 220 respectively accommodating the first and second battery cells C1 and C2 and a circuit accommodator 250 formed between the first and second cell accommodators 210 and 220 and accommodating a protection circuit for controlling charging and discharging operations.

A top surface of the circuit accommodator 250 may have downward steps S with respect to top surfaces of the first and second cell accommodators 210 and 220. For example, a top or bottom surface of the circuit accommodator 250 is led into the circuit accommodator 250, thereby reducing a dead space of the circuit accommodator 250 and reducing an overall volume of the secondary battery.

Such a leading shape of the circuit accommodator 250 not only reduces the overall volume of the secondary battery, but may also substantially prevent physical interference with a set device (not shown) and substantially prevent the secondary battery from shaking or moving inside the set device when the secondary battery is used as a driving power source of the set device. For example, when an internal mounting space of the set device is stepped, the secondary battery is compactly mounted, and the secondary battery is substantially prevented from shaking or moving inside the set device by assembling the set device and the secondary battery to match each other.

Meanwhile, according to the secondary battery of FIG. 8, the case 200 includes upper and lower cases 200U and 200L that are assembled to face each other, wherein the first and second battery cells C1 and C2 and a protection circuit 255 between the first and second battery cells C1 and C2 are formed between the upper and lower cases 200U and 200L. The case 100 may accommodate all of the first and second battery cells C1 and C2 and the protection circuit 255. For example, the case 100 entirely accommodates the first and second battery cells C1 and C2.

As described above, according to at least one of the disclosed embodiments, an unnecessary dead space inside a secondary battery may be removed and an overall volume of the secondary battery may be reduced.

Also, when the secondary battery is applied as a driving power source of a set device, physical interference with the set device may be removed and the secondary battery may be prevented from shaking or moving inside the set device.

While the inventive technology has been described with reference to the figures, it will be understood by those of ordinary skill in the art that various changes in form and details may be made therein without departing from the spirit and scope as defined by the following claims.

What is claimed is:

1. A secondary battery, comprising:
    first and second battery cells facing each other; and
    a case comprising first and second cell accommodators respectively at least partially accommodating the first and second battery cells, and a circuit accommodator formed between the first and second cell accommodators and accommodating and enclosing a protection circuit configured to control charging and discharging operations of the first and second battery cells,
    wherein the circuit accommodator has top and bottom surfaces opposing each other, wherein each of the first and second cell accommodators has top and bottom surfaces opposing each other, wherein the top surface of the circuit accommodator of the case has a downward step with respect to the top surfaces of the first and second cell accommodators of the case,
    wherein the first and second battery cells are respectively partially inserted into the first and second cell accommodators of the case,
    wherein each of the first and second cell accommodators comprises:
    a rim portion that surrounds front ends of the first and second battery cells and forms openings configured to accommodate the first and second battery cells,
    and wherein a main surface of the protection circuit and main surfaces of the first and second battery cells face the same upward-downward direction.

2. The secondary battery of claim 1, wherein the top surface of the circuit accommodator and the top surfaces of the first and second cell accommodators face substantially the same direction as a main surface of each of the first and second battery cells, and wherein the main surface is defined as a surface having the greatest area in each of the first and second battery cells.

3. The secondary battery of claim 1, wherein the bottom surface of the circuit accommodator and the bottom surfaces of the first and second cell accommodators are substantially coplanar.

4. The secondary battery of claim 1, wherein each of the first and second battery cells comprises a cell body and an electrode tab extending outwardly from the cell body, and wherein the electrode tabs of the first and second battery cells extend in directions facing each other.

5. The secondary battery of claim 1, wherein the case has a substantially rectangular shape having a pair of long side portions and a pair of short side portions.

6. The secondary battery of claim 5, wherein the first and second battery cells are assembled in a direction substantially parallel to the pair of long side portions of the case.

7. The secondary battery of claim 1, wherein each of the first and second cell accommodators further comprises:
    a blocking portion that defines an assembled location of the first and second battery cells.

8. The secondary battery of claim 7, wherein each of the first and second battery cells comprises an electrode tab extending towards the circuit accommodator by detouring the blocking portion and connected to the protection circuit.

9. The secondary battery of claim 1, wherein the rim portion entirely surrounds outer circumferences of the front ends of the first and second battery cells.

10. The secondary battery of claim 1, wherein the rim portion has a shape matching the front ends of the first and second battery cells.

11. The secondary battery of claim 1, wherein the rim portion is formed seamlessly.

12. The secondary battery of claim 1, wherein the circuit accommodator comprises:
    a body that integrally extends from the first and second cell accommodators; and
    a cover that is connected to the body and forms an accommodation space together with the body.

13. A secondary battery, comprising:
    first and second battery cells facing each other; and
    a case comprising first and second cell accommodators respectively at least partially accommodating the first and second battery cells, and a circuit accommodator formed between the first and second cell accommodators and accommodating a protection circuit configured to control charging and discharging operations of the first and second battery cells,
    wherein the circuit accommodator has top and bottom surfaces opposing each other, wherein each of the first and second cell accommodators has top and bottom surfaces opposing each other, wherein the top surface of the circuit accommodator has a downward step with respect to the top surfaces of the first and second cell accommodators,
    wherein the first and second battery cells are respectively inserted into the first and second cell accommodators,
    wherein each of the first and second cell accommodators comprises:
    a rim portion that surrounds front ends of the first and second battery cells and forms openings configured to accommodate the first and second battery cells,
    wherein a main surface of the protection circuit and main surfaces of the first and second battery cells face the same upward-downward direction,
    wherein the circuit accommodator comprises:
    a body that integrally extends from the first and second cell accommodators; and
    a cover that is connected to the body and forms an accommodation space together with the body,
    wherein the body has top and bottom surfaces opposing each other, and wherein the top surface of the body integrally extends from the first and second cell accommodators, and wherein the bottom surface of the body is opened to be combined to the cover.

14. The secondary battery of claim 12, wherein the body has top and bottom surfaces opposing each other, and wherein the top surface of the body has a downward step with respect to the top surfaces of the first and second cell accommodators.

15. A secondary battery, comprising:
    first and second battery cells facing each other; and
    a case comprising first and second cell accommodators respectively at least partially accommodating the first and second battery cells, and a circuit accommodator formed between the first and second cell accommodators and accommodating and enclosing a protection circuit configured to control charging and discharging operations of the first and second battery cells,
    wherein the circuit accommodator has top and bottom surfaces opposing each other, wherein each of the first and second cell accommodators has top and bottom surfaces opposing each other, and wherein the top surface of the circuit accommodator of the case is closer to the bottom surface of the circuit accommodator than the top surfaces of the first and second cell accommodators of the case, wherein the first and second battery cells are respectively partially inserted into the first and second cell accommodators of the case, wherein each of the first and second cell accommodators comprises:

a rim portion that surrounds front ends of the first and second battery cells and forms openings configured to accommodate the first and second battery cells, and wherein a main surface of the protection circuit and main surfaces of the first and second battery cells face the same upward-downward direction.

16. The secondary battery of claim 15, wherein the top surface of the circuit accommodator has a downward step with respect to the top surfaces of the first and second cell accommodators.

17. The secondary battery of claim 15, wherein each of the first and second battery cells comprises a cell body and an electrode tab extending outwardly from the cell body, and wherein the electrode tabs of the first and second battery cells extend in directions facing each other.

18. The secondary battery of claim 15, wherein the top surface of the circuit accommodator does not overlap the top surfaces of the first and second cell accommodators in a direction substantially parallel to the bottom surface of the case.

19. The secondary battery of claim 18, wherein the bottom surface of the circuit accommodator is substantially aligned with the bottom surfaces of the first and second cell accommodators in the direction.

20. The secondary battery of claim 1, wherein each of the first and second battery cells comprises a cell body and an electrode tab extending outwardly from the cell body, and wherein the electrode tabs of the first and second battery cells and upper end portions of the cell bodies are inserted into the first and second cell accommodators, and wherein the remaining portions of each battery cell are not are inserted into the first and second cell accommodators.

* * * * *